United States Patent
Vansteenkiste et al.

(10) Patent No.: US 12,212,658 B2
(45) Date of Patent: Jan. 28, 2025

(54) METHOD AND SYSTEM FOR SELECTIVE AND PRIVACY-PRESERVING ANONYMIZATION

(71) Applicant: BRIGHTER AI TECHNOLOGIES GMBH, Berlin (DE)

(72) Inventors: Elias Vansteenkiste, Berlin (DE); Marian Glaser, Berlin (DE)

(73) Assignee: BRIGHTER AI TECHNOLOGIES GMBH, Berlin (DE)

(*) Notice: Subject to any disclaimer, the term of this patent is extended or adjusted under 35 U.S.C. 154(b) by 269 days.

(21) Appl. No.: 17/997,141

(22) PCT Filed: Apr. 27, 2021

(86) PCT No.: PCT/EP2021/061022
§ 371 (c)(1),
(2) Date: Oct. 26, 2022

(87) PCT Pub. No.: WO2021/219665
PCT Pub. Date: Nov. 4, 2021

(65) Prior Publication Data
US 2023/0198745 A1 Jun. 22, 2023

(30) Foreign Application Priority Data
Apr. 27, 2020 (EP) .................... 20171499

(51) Int. Cl.
*H04L 9/08* (2006.01)
*G06F 21/62* (2013.01)
(Continued)

(52) U.S. Cl.
CPC ........ *H04L 9/0819* (2013.01); *G06F 21/6254* (2013.01); *G08B 13/19686* (2013.01);
(Continued)

(58) Field of Classification Search
CPC ..... H04L 9/0819; H04L 63/0421; H04L 9/08; G06F 21/6254; G08B 13/19686; G08B 29/186; G08B 13/196; H04W 12/02
See application file for complete search history.

(56) References Cited

U.S. PATENT DOCUMENTS

2005/0246344 A1* 11/2005 Keller .................. H04L 51/212
2014/0047551 A1 2/2014 Nagasundaram et al.
(Continued)

FOREIGN PATENT DOCUMENTS

| WO | WO-2017021953 A1 | 2/2017 |
| WO | WO-2017087074 A1 | 5/2017 |
| WO | WO-2019206524 A1 | 10/2019 |

OTHER PUBLICATIONS

Keith et al., Understanding Video Metadata, https://exiftool.org/forum/index.php?topic=10646.0, Dec. 3, 2019 (Year: 2019).*

(Continued)

*Primary Examiner* — Robert B Leung
*Assistant Examiner* — Howard H. Louie
(74) *Attorney, Agent, or Firm* — Schwegman Lundberg & Woessner, P.A.

(57) ABSTRACT

The application is directed at a method and system for selective anonymization, wherein the method comprises the steps of capturing visual streaming data, identifying an anonymizable object in the visual data, for which a quantized identity (y) and an individual private key (n) is determined. Based on the individual private key (n) and the quantized identity (y), the first set of encryptions (E1) is calculated, comprising at least two distinct encryptions of the quantized identity. The first set of encryptions (E1) of the quantized identity (y) is sent to a central server, which, in return, sends an exception information indicating if an exception list of the central server comprises a set of exception encryptions (E2) which corresponds to the first set (Continued)

of encryptions (E1). The anonymizable object is then selectively anonymized in the streaming visual data depending on the exception information and an operating mode of the edge device, thereby generating selectively modified visual streaming data and the selectively modified visual streaming data is transmitted to a remote database.

20 Claims, 5 Drawing Sheets

(51) Int. Cl.
  *G08B 13/196* (2006.01)
  *H04L 9/40* (2022.01)
  *H04W 12/02* (2009.01)
  *G08B 29/18* (2006.01)
(52) U.S. Cl.
  CPC ......... *H04L 63/0421* (2013.01); *H04W 12/02* (2013.01); *G08B 29/186* (2013.01)

(56) References Cited

U.S. PATENT DOCUMENTS

| | | |
|---|---|---|
| 2014/0328547 A1 | 11/2014 | Whitehill et al. |
| 2015/0104103 A1 | 4/2015 | Candelore |
| 2015/0149765 A1 | 5/2015 | Pauliac et al. |
| 2016/0313939 A1 | 10/2016 | Andrews et al. |
| 2017/0177883 A1* | 6/2017 | Paterra .................. G06F 21/44 |
| 2018/0249125 A1 | 8/2018 | Mate et al. |
| 2019/0286847 A1 | 9/2019 | Kato |
| 2020/0034565 A1 | 1/2020 | Kim |
| 2020/0098096 A1 | 3/2020 | Moloney |
| 2020/0159961 A1* | 5/2020 | Smith .................. G06F 9/5044 |

OTHER PUBLICATIONS

"International Application Serial No. PCT/EP2021/061022, International Search Report dated Dec. 7, 2021", (Dec. 7, 2021), 5 pgs.

"International Application Serial No. PCT/EP2021/061022, Written Opinion dated Dec. 7, 2021", (Dec. 7, 2021), 9 pgs.

Chen, Weihua, et al., "Beyond triplet loss: a deep quadruplet network for person re-identification", Proceedings of the IEEE conference on computer vision and pattern recognition, (2017), 10 pgs.

Martin, Karl, et al., "Privacy protected surveillance using secure visual object coding", IEEE Transactions on Circuits and Systems for Video Technology 18.8, (2008), 1152-1162.

Soleymani, Roghayeh, et al., "Progressive boosting for class imbalance and its application to face re-identification", Expert Systems with Applications 101, (2018), 271-291.

Wang, Faqiang, et al., "Joint learning of single-image and cross-image representations for person re-identification", Proceedings of the IEEE conference on computer vision and pattern recognition, (2016), 9 pgs.

* cited by examiner

METHOD AND SYSTEM FOR SELECTIVE AND PRIVACY-PRESERVING ANONYMIZATION

This patent relates to the field of privacy-preserving analytics for visual data. Specifically, the subject-matter of this patent application relates to a computer-implemented method that allows for an edge terminal device, such as a video camera, to off-load usable visual data analytics to the cloud in a privacy-preserving manner, while taking individual privacy settings into account.

Cameras are omnipresent in public locations like airports, train stations, industry infrastructure, etc. These cameras are at the edge of a distributed system. In such a distributed system the cameras are rather uncomplicated. Their main task is to stream the captured video to a central server via the associated cloud. The central server is responsible for analysis and storage of the video data. The transmission of the video data over the cloud makes the data vulnerable to man-in-the-middle attacks and is thus an important risk of leaking sensitive data. In case the video is transmitted successfully then the central server is solely responsible for anonymization and protection of privacy. The server will inevitably need to store the incoming streamed data before it can feed it to the anonymization services.

However, in today's world, when privacy has become an important issue in light of several high-profile cases of privacy infringement, people have become very sensitive about the privacy of their data. At the same time, government regulations such as GDPR have been enacted that aim to safeguard the privacy of users' data. In particular, since the introduction of GDPR, storing personally identifiable information requires permission from the subjects. These permissions are very hard to come by.

Furthermore, there may be legal provisions which mandate that personal data, such as visual data collected by security cameras, may only be stored locally (i.e. in the location where said data was collected) and/or that such data must be deleted or anonymized after a given time frame.

Nevertheless, despite all privacy concerns, data collection is important for both businesses and consumers for a variety of reasons, including the provision and receipt of personalized services, respectively. However, as a result of regulations such as GDPR and those that will likely be enacted in the future across the globe, businesses are increasingly expected to ask for consent before collecting and/or analyzing personal data, and to provide users the right to access and delete the data collected on them.

One way to achieve this is to build and maintain a secure infrastructure. Such a system would ask for consent from the consumer/user before collecting personal data, and store this data safely while allowing users to access the data collected on them. This approach is cumbersome for both businesses and users, as it forces people to read often lengthy and convoluted privacy policies while at the same time forcing businesses to allow each individual user who opts-in to access her data safely. Furthermore, even if a user has given consent for a system to collect personalized data, such consent is often limited in some way, so that the sharing of said data with other systems might still be forbidden. Furthermore, such a secure system requires frequent verification procedures and every (analytics) service has to be run within the secure environment which increases cost.

An alternate approach to the above would be the anonymization of personally identifiable, or privacy infringing, information. For instance, in the case of video monitoring, camera terminals may be provided with processing power to run object and facial detection algorithms so that they may blur and/or obfuscate image features that could be deemed privacy infringing. For instance, a person's face may be blurred, pixilated or replaced by another object so that she is anonymized. At the same time, other 'identifiables' such as license plates, credit card details, etc., may also be blurred.

Another easy solution to avoid privacy infringement by transmitting and storing video data is to include processing power in the cameras which allows the cameras to produce metadata. This allows the system to only send the metadata over the cloud to the central server. However, in this solution the original video stream, which is necessary in a range of applications, becomes unavailable. For example, using metadata, it might not be possible to later measure different analytic metrics that are not known at the moment of recording. Furthermore, if a crime happens at a location, it might become necessary to access the raw video sequence from the security camera to investigate the crime.

Thus, obfuscation or metadata might also remove many of the features that a business may find beneficial for undertaking various tasks and/or providing services. Consider, as a trivial example, a retail corporation that may infer people's satisfaction levels from their expressions as they stand in checkout queues or at self-service counters at its hypermarkets. The corporation may then, in case of user dissatisfaction, take appropriate actions, such as adding more cash tills or improving its self-check-out counters, etc. However, if the entire face is blurred then a consumer's expressions may not be used fruitfully by the corporation to improve its service.

To anonymize video data more proficiently, techniques such as deep natural anonymization may be used, where the personal information gets modified beyond recognition while maintaining other, non-privacy infringing information such as facial expression, age, gender as well as hair and skin color.

Additionally, there may be different groups of users which need to be treated differently for anonymization purposes. For example, some users may lose their right to be anonymized for legal reasons, such as court order or criminal convictions. Other users may voluntarily waive their right to anonymization (this scenario is also referred to as "white-list scenario" in the following). This white-list scenario, where personal information may only be collected with explicit consent of the respective person is in line with the strict privacy rules set out in GDPR and similar legislation.

The reverse scenario is also possible, where a facility, such as a military or infrastructural facility, requires all visitors to waive their right no anonymization upon entering for security reasons. At the same time, however, employees of the facility (such as military personnel) may need to be anonymized in the streaming data before the respective video stream leaves the respective facility (also referred to as "black-list scenario" in the following). This black-list scenario, where personal information may be collected unless the respective person has explicitly opted out of their data being collected is in line with the less strict privacy rules set out in California's Privacy act (CPAct) or Illinois' Information Privacy Act (BIPA).

However, selectively anonymizing visual streaming data is not straightforward for at least the following reasons.

Whether or not to anonymize visual data, needs to preferably be decided locally, i.e. at a processor which is in the same location as the camera capturing the respective video stream. Thus, said processor needs to access a respective list based on which the local processor can decide whether or not to anonymize a specific user before transmitting the video stream to another (external) server. Storing the list locally for every camera or even for every location is prohibitive and would require frequent updates in order to ensure consistency. However, storing such a list (either "white-list" of users who do not need to be anonymized, or a "black-list" of users who need to be anonymized) remotely causes additional privacy and complexity concerns, as identifying information of a user cannot be transmitted remotely before knowing that said user does not need to be anonymized. Also, downloading the respective list for each comparison demands a lot of bandwidth and incurs more opportunities for a malicious party to deploy a man-in-the-middle attack to obtain information about the respective list. Additionally, checking each appearance for matches on the camera side can be computationally demanding for the edge device associated with the camera.

US20160313939 provides a method to anonymize portions of streaming data that can be potentially privacy infringing. However, it does not deal with image data. Thus, it does not solve either of the two problems stated above. On the other hand, US20140328547A1 provides a method for anonymizing a person's face while retaining some other features, but does not provide any disclosure regarding the determination when to anonymize a person.

It is an object of the present application to solve these problems by providing a method for individualized, privacy-preserving modification of visual data, in particular visual streaming data, where the modified data can still be used for analytics in a meaningful manner.

This object is solved by the method and system of the independent claims. Advantageous further developments are represented by the features of the dependent claims and of the embodiments described.

Before going into the details regarding the proposed and claimed method and system, terminology and sub-components which appear throughout the description are defined and explained.

A re-identification network/model is a computer algorithm or computer-based apparatus that is configured to re-identify persons/faces or other objects starting from images or video. A re-identification network can, for example, be based on convolutional neural networks or other machine learning models, which are trained to re-identify persons/faces from images or video. The input that is fed to this model is typically one or more images or an image patches that contains a face/person, the output is an identity vector.

For the appearance of an anonymizable object within a captured video stream, the re-identification network calculates an identity vector. The identity vector represents the identity of this object. Typically, the identity vector is a fixed-size vector of floating numbers.

The camera on the edge is responsible for recording video and selective anonymization of the identities that are subject in the input video.

An appearance is a video fragment that starts at the moment a person, or other anonymizable object, comes into the view of the camera until the person leaves the camera view. In the case when the person comes in and out of the camera's view, a timeout window (a number of frames) can optionally be used for the person before the appearance is closed. In this case, the identity of the person in the appearance is retained after the person is out of the camera's view for a given number of frames as long as the number of frames is lower than the timeout window.

For every appearance, the camera will use the re-identification model to calculate the identity vector of the appearance. Subsequently it will encrypt this identity vector and send a matching request to the central server to check if the identity is part of a white- or blacklist. Once the central server responds, it will either anonymize or not anonymize the appearance. Once all appearances of a frame are processed the anonymized video can either be stored locally or sent to the central server for storage and analysis.

The setup process is responsible for adding the identities of persons to the white-/blacklist, wherein said list is preferably stored on the central server. This process can take different forms. It could be a physical booth, a website or a mobile app where customers can sign up to be added to the white-/blacklist or it also could be a process that processes identities from a criminal database. The setup process also has a re-identification model and will calculate the identity vector for each person that is supposed to be added to the list. These identities are encrypted and sent in a list addition request to the central server. The setup process may be used to set up the initial white- or blacklist and it may also be used to add further identities to the list later on.

The central server receives list addition requests from the setup process. For each list addition request, the encrypted identity inside the request is added to the list that resides in the local database of the server. The central server also receives matching requests from the cameras on the edge. The encrypted identities in the matching request are compared to the encrypted identities on the white-/blacklist. Once the server decides whether there is a match or not, then the server answers to the edge cameras with the matching result. Additionally, the central server might also perform other tasks, for example, collecting and storing anonymized video streams.

An encryption scheme is a method or algorithm for encoding a message or information in such a way that only authorized parties can access it and those who are not authorized cannot. Encryption does not itself prevent interference but denies the intelligible content to a would-be interceptor. In an encryption scheme, the intended information, referred to as plaintext is encrypted using an encryption algorithm generally involving a secret key, thereby generating ciphertext that can be read-only if decrypted by a corresponding decryption algorithm which again needs the key or another corresponding decryption key. It is in principle possible to decrypt the message without possessing the key, but, for a well-designed encryption scheme, considerable computational resources and skills are required.

A public-key encryption scheme is a special case of an encryption scheme, wherein the encryption key is published for anyone to use and encrypt messages. However, only the receiving party has access to the decryption key that enables messages to be read. In the following, the provided examples address two public-key encryption schemes, namely, elliptic curve cryptography and RSA. Both of these encryption schemes are briefly explained in the following.

Elliptic Curve Cryptography is a commonly used and well-known technique for a key exchange protocol. An elliptic curve is a plane curve over a finite field which consists of the points satisfying the equation $$y^2 = x^3 + ax + b, \text{ with } 4a^3 + 27b^2 \neq 0$$

along with a distinguished point at infinity. This set together with the group operations of elliptic curves is an Abelian group, with the point at infinity as an identity element. The group operations of elliptic curves are point negation and point addition. Point multiplication can be easily defined with the help of point addition. The aforementioned operations always produce points on the curve or the point at infinity, so these group operations can be considered closed.

For encryption, one-way functions are crucial, as a one-way function is a function that is easy to compute on every input, but hard to invert given the output of the function of a random input.

Forward elliptic curve point multiplication has a low run-time complexity. It can be done efficiently by calculating the powers of two. The inverse operation, which is called the elliptic curve discrete logarithm problem (ECDLP) has a higher runtime complexity. This mechanism is used to share a secret key k, by multiplying k with a point P on the elliptic curve and then only sharing the product k·P.

The RSA algorithm involves four steps: key generation, key distribution, encryption, and decryption.

A basic principle behind RSA is the observation that it is practical to find three very large positive integers e, d and n such that with modular exponentiation for all integers m (with 0≤m<n) the following equation holds, but that even when knowing e and n or even m it can be extremely difficult to find d.

RSA is based on the factorization of large numbers and involves a public key and a private key. The public key can be known by everyone, and it is used for encrypting messages. The intention is that messages encrypted with the public key can only be decrypted in a reasonable amount of time by using the private key. The public key is represented by the integers n and e; and, the private key, by the integer d (although n is also used during the decryption process. Thus, it might be considered to be a part of the private key, too). m represents the message (previously prepared with a certain technique explained below).

Further details regarding elliptic curve cryptography and RSA as well as other public-key encryption schemes can be found in the literature.

The object of the present application, i.e. providing a method for individualized, privacy-preserving modification of visual data, in particular visual streaming data, where the modified data can still be used for analytics in a meaningful manner is addressed by the following method of selective anonymization comprising the following steps.

(a) Capturing, by an Edge Device, Streaming Visual Data.

The capturing of visual streaming data by the edge device may, for example, be carried out by a camera associated with the edge device. One example includes cameras installed for CCTV or other security-related applications. Visual streaming data may also be captured by private cameras. Captured visual streaming data may, in general, include images which are privacy infringing when shared publicly.

(b) Identifying, by the Edge Device, an Anonymizable Object in the Visual Data.

The identifying of the anonymizable object may be carried out using state of the art or custom implemented facial detection algorithms or algorithms for detecting number plates or other target objects that are potentially privacy infringing.

(c) Calculating, by the Edge Device, a Quantized Identity y of the Identified Anonymizable Object.

After the appearance of an anonymizable object has been identified in the visual streaming data, the edge device is configured to determine a quantized identity of the anonymizable object. This can, for example, be achieved by first determining an identity vector for the anonymizable object in question. The algorithm used for determining the identity vector needs to ensure preciseness of the determined identity vectors in the sense that two appearances of the same object (such as face, number plate, etc.) are mapped to the same or at least to two very similar (i.e. identical within a given, very small error threshold) identity vectors. An identity vector is typically a vector of several floating numbers. Furthermore, the algorithm used for determining the identity vector needs to ensure that two different objects, e.g. the face of two different people, are mapped to different identity vectors. Algorithms which achieve these conditions are known, see, for example, the following publications:

Soleymani, Roghayeh, Eric Granger, and Giorgio Fumera. "Progressive boosting for class imbalance and its application to face re-identification." Expert Systems with Applications 101 (2018): 271-291.

Chen, Weihua, et al. "Beyond triplet loss: a deep quadruplet network for person re-identification." Proceedings of the IEEE Conference on Computer Vision and Pattern Recognition. 2017.

Wang, Faqiang, et al. "Joint learning of single-image and cross-image representations for person re-identification." Proceedings of the IEEE Conference on Computer Vision and Pattern Recognition. 2016.

In general, the identity vector is obtained by feeding image patches to a reidentification network. This network is trained to produce the same identity vector when image patches are taken from the same object, for example from the same person. There many ways to train the reidentification network to output a specific type of identity vector and how those vectors are used to distinguish between identities.

For example the re-identification network can be trained to produce a vector of fixed sized independent components. Two identity vectors are then considered to belong to the same object if a certain number of components of the two identity vectors have a distance smaller than a predefined threshold.

However, other methods are also known from face identification/verification research. One example is that if the angle between two identity vectors is smaller than a given threshold, then the vectors are considered to have been produced based on the same object. The re-identification network is in this case trained to minimize the angles between image patches coming from the same identity. In this approach quantization is performed based on the angles of the vectors rather than based on the amplitude of each component, see for example https://en.wikipedia.org/wiki/Cosine_similarity.

Also, a hybrid approach is possible, where sub-vectors that are matched via the angles and the decision whether two identity vectors match is then made based on how many sub-vectors matched.

After an identity vector for the current appearance of the anonymizable object has been determined, the identity vector is quantized. Quantization can result in a single numeric value or might result in a vector of numeric values as discussed below.

(d) Determining, by the Edge Device, an Individual Private Key n for the Quantized Identity y.

After the quantized identity y has been obtained, an individual private key is determined for y. This private key n may be entirely random, i.e. it does not need to be related to y in any way. Preferably, n is selected in such a way, for example by randomly choosing n, that n is entirely unrelated to y. Alternatively, at least a part of y might be used in order to determine the key n. The private key n is used as an offset in order to ensure adequate security even when the value of the quantized identity y is small (which may be associated with weak security, as explained below). Furthermore, n may be used to increase the privacy of the transmitted encryptions, as the adding of the offset n to the quantized (i.e. numeric) identity ensures that two encryption determined for the same quantized identity will be different, thereby making it more difficult for an intruder to infer any knowledge regarding repeated detection of the same identity (and, hence, person) even when intercepting the encrypted identity.

(e) Calculating, by the Edge Device, a First Set of Encryptions E1 Comprising at Least Two Distinct Encryptions of the Quantized Identity, Wherein whe Encryptions of the First Set of Encryptions E1 are Determined Based at Least on the Individual Private Key n and the Quantized Identity y.

The individual private key n and the quantized identity y are not known to the central server, thereby increasing the security as discussed above. Further parameters may additionally be taken into account when calculating the at least two distinct encryptions. By calculating two distinct encryptions, it is furthermore possible to distribute the private data, thereby increasing the security.

(f) Sending, by the Edge Device, the First Set of Encryptions E1 of the Quantized Identity y to a Central Server.

Only the calculated encryptions are transmitted to the central server. None of y, n or any other secret parameters are transmitted to the central server. After transmission, the edge device may, optionally, delete y and n for added security.

(g) Receiving, by the Edge Device from the Central Server, an Exception Information wherein the Exception Information Indicates if an Exception List 208 of the Central Server Comprises a Set of Exception Encryptions which Corresponds to the First Set of Encryptions E1.

The central server, based on the received set of encryptions E1, can determine whether a corresponding set of exception encryptions E2 is contained in the exception list stored on the central server or in an associated storage. The central server is unaware of any private or individual keys and is also unaware of the quantized identity y. Note that the quantized identity y already does not allow re-determination of the visual data regarding the object based on which y was calculated. However, if the quantized identity y is leaked, then an attacker could use y for comparison and find out which object y is associated with. After the central server has determined whether corresponding keys are contained in the exception list, the central server sends a message to the edge device, which comprises information stating if corresponding, i.e. matching, encryptions are comprised by the exception list.

(h) Selectively Anonymizing, by the Edge Device, the Anonymizable Object in the Streaming Visual Data Depending on the Exception Information and an Operating Mode of the Edge Device, thereby Generating Selectively Modified Visual Streaming Data.

After the edge device receives anonymization information from the central server, wherein the anonymization information indicates whether or not a set of exception encryptions E2 corresponds to the transmitted set of encryptions E1 is contained in the exception list stored on the server, the edge device selectively anonymizes the respective object, i.e. the appearance of said object, in the video stream depending on the received anonymization information. This way, the edge device generates a selectively modified visual streaming data. The selectively modified visual streaming data may be identical to the originally captured visual streaming data if none of the appearances of anonymizable objects actually need to be anonymized. On the other hand, it is also possible that one or more appearances of anonymizable objects in the visual streaming data need to be anonymized.

(i) Transmitting, by the Edge Device, the Selectively Modified Visual Streaming Data to a Remote Database.

The database may be a cloud storage system and/or the database may be located on the central server or associated with the central server.

The selectively modified visual streaming data no longer comprises privacy infringing appearances of any people, faces or other anonymizable objects. Therefore, the selectively modified visual streaming data may be transmitted to a remote database, which may be located on the central server.

Preferably the described method steps are performed in the given order.

Preferably, when the anonymization information indicates to anonymize the anonymizable object, the anonymizable object is anonymized using deep natural anonymization.

Deep natural anonymization is designed to change the identity vector of the appearance. How much the identity vector is changed is dependent which attributes should be retained after anonymization and is, therefore, dependent on the application. The minimum requirement is that $ID(x) \neq ID(DNA(x))$ wherein x is an appearance, ID is the re-identification network, or respective mapping, and DNA is the deep natural anonymization mapping.

Deep natural anonymization has the advantage of removing privacy infringing details while preserving other, non-privacy infringing information, for example, in the case of a face, this may mean that the face is modified beyond recognition (by both a human and a facial detection algorithm) while other information such as facial expression, age, gender, ethnicity are preserved. Data that is modified using deep natural anonymization can be used for analytics, for example, regarding consumer satisfaction, etc. without infringing on the privacy of the depicted individuals. In general, deep natural anonymization determines a different naturally anonymized version for each occurrence of the same person or another identifiable objects, such as license plates. Depending on the application, in addition to anonymizing facial characteristics, other identifying characteristics such as hair, clothes, gait, etc. may also need to be modified.

Preferably, the central server comprises an exception list, which contains one or more sets of exception encryptions, each of which comprises at least two distinct exception encryptions, and the method preferably comprises the following additional steps, which are performed between the steps (f) and (g) as defined above:

(f1) Receiving, by the central server, the first set E1 of encryptions of the quantized identity y sent by the edge device.

(f2) Determining, by the central server, whether there is an exception set E2 in the exception list comprising at least two distinct exception encryptions such that the first set of encryptions E1 corresponds to the exception set of encryptions E2.

The central server goes through the exception list and checks, for each set of exception encryptions E2 in the exception list, if the set of exception encryptions E2 corresponds to the first set of exception encryptions E1, which has been received from the edge device. If a corresponding set is found in the exception list, the server may halt the search to safe computing resources and time.

(f3) If an exception set of encryptions E2 which corresponds to the received first set of encryptions E1 exists in the exception list, sending, by the central server to the edge device, exception information indicating that there is a matching identity in the exception list, otherwise, sending, by the central server to the edge device, exception information indicating that there is no matching identity information in the exception list.

In this way, the central server communicates to the edge device if a match was found. Depending on whether the exception list is a white list or a blacklist, as explained above and below, the fact that a corresponding set of exception encryptions was found may have different implications. However, it is, in general not necessary for the server to know whether the exception list is a white list or a blacklist, as the respective action (anonymizing the associated appearance of an object or not) is handled by the edge device. So it is enough if the edge device is aware of the default and exception setting by way of the operation mode of the edge device.

It is possible that the exception list is fixed at the beginning of the application and does not change. However, in most application scenarios, a dynamically changing exception list is at least a possibility. Thus, it often needs to be possible to add set s of exception encryptions to the exception list and, preferably it is also possible to remove sets of exception encryptions from the exception list. For example, deleting an identity from the exception list, can be achieved based on a few sample images of the identifiable object. An identity vector is calculated by the reidentification network. This is encrypted in the same way as it is done by the edge device, i.e. at the camera side. A delete request is sent to the central server and the central server can then determine if a match is found in the exception list. If a match is found then the entry is deleted.

Preferably, a set of exception encryptions can be added to the exception list through the following method steps, which are performed by the following method steps by a setup device, preferably before the method step (a) as described above.

(a1) Capturing, by a setup device, visual data of an exception object.

First, the setup device needs to capture visual data of the respective exception object. Again, the exception object might be a face, a person, a license plate or other privacy infringing visual data. The visual data is preferably captured by a camera associated with or integrated into the setup device. The visual data might be video data or might be one or more still images taken of the object. For example, the setup device could be included in a photo booth where people can have their picture taken in order to opt-out of anonymization or to opt-in to anonymization.

(a2) Calculating, by the setup device, a quantized identity x of the exception object.

Then, the setup device calculates a quantized identity x of the exception object. This can be done in the same manner as described above with respect to the edge device.

(a3) Determining, by the setup device, an individual private key m for the quantized identity x of the exception object.

Then, again in the same manner as it is done by the edge device, the setup device determines an individual private key m, which serves as an offset on the quantized identity x, in order to guard x against weak security.

(a4) Calculating, by the edge device, the set of exception encryptions E2 comprising at least two distinct exception encryptions of the quantized identity x of the exception object, wherein the exceptions encryptions of the set of exception encryptions E2 are determined based at least on the individual private key m and the quantized identity x.

A set of at least two exception encryptions is calculated in order to further increase the security as explained above with respect to the edge device.

(a5) Transmitting, by the setup device to the central server, the set of exception encryptions E2, wherein the central server adds the received set of exception encryptions to the exception list.

One of the main advantages of the proposed method and corresponding system is that none of the secret components of the encryptions scheme, i.e. neither the individual private keys morn nor any of the identity vectors or respective quantized identities x or y are ever transmitted. This sensitive data is only stored locally on the capturing edge or setup device and might also only be stored temporarily. That is, after it is decided whether the respective object needs to be anonymized or not, the edge or setup device may, preferably immediately, delete all privacy infringing data as well as the respective private keys n or m and the identity vectors or respective quantized identities.

The central server only acquires the respectively generated encryptions and compares those by performing some predefined comparison operation which preferably cross compares the encryptions of the encryption set E1 received from the edge device with the exception encryptions of each of the sets of exception encryptions stored in the exception list of the central server.

In particular, the comparison of the set of encryptions received from the edge device with a set of exception encryptions contained by the exception list of the central server, as discussed above with respect to step (f2) may be implemented by a cross-check involving at least two encryptions received from the edge device and at least two exception encryptions of the respective exception encryption set stored in the exception list of the central server.

Such a "cross-check" may be implemented, for example, as follows, wherein correspondence of the first set of encryptions E1 and the set of exception encryptions E2 is determined by the following steps.

(f2-1) Calculating a first result of a first operation which takes as input at least a first encryption S of the first set of encryptions E1 and a first exception encryption Q of the set of exception encryptions E2.

(f2-2) Calculating a second result of a second operation which takes as input at least a second encryption T of the first set E1 of encryptions and a second exception encryption R of the set E2 of exception encryptions.

(f2-3) Determining that the first set of encryptions E1 corresponds to the set E2 of exception encryptions if and only if the first result equals the second result.

The cross-check method for comparing the first set of encryptions E1 with the set of exception encryptions E2 preferably relies on the encryptions used in both sets being chosen in such a way that all components except for the quantized identities x and y cancel themselves out during a comparison of the first result and the second result. Thus, the first result will equal the second result if and only if the quantized identity y, based on which the first set of encryptions E1 was determined, and the quantized identity x, based on which the set of exception encryptions E2 was determined, are equal.

In order for this approach to work, it is preferably that the first and second operations are both homomorphism and that they are preferably based on the same arithmetic operations which were also used to calculate the respective encryptions based on the quantized identities, the private keys n and m and, possibly, other parameters.

Also, for security reasons, it is preferable that the first encryption S, the second encryption T, the first exception encryption Q and the second exception encryption R are mutually distinct. If this is not the case, then the scheme for determining correspondence as described under steps (f2-1), (f2-2), and (f2-3) above would still work, but the security would be considerably weakened.

In step (e) and in step (a4) as described above, the calculation of the encryptions or exception encryption may, additionally be based on a cryptographic function f and/or a common secret k, which might be known to both the edge device and setup device but not to the central server. The cryptographic function f also does not need to be known to the central server. The cryptographic function might be publicly known as part of a public-key encryption scheme, in which case the cryptographic function is a one-way function, thereby making decryption very time-consuming and difficult. As explained above and below, decryption of the calculated encryptions might not be necessary, as the resulting encryptions are used for comparison but do not need to be decrypted by any of the involved devices.

Thus, any cryptographic function f may be used. An example for calculating encryptions and exception encryptions while using a cryptographic function f and a binary operation $\oplus$, wherein the binary operation $\oplus$ is a commutative operation, which is preserved by the cryptographic function f, i.e. $f(v \oplus w) = f(v) \oplus f(w)$ for all v,w in the domain of the cryptographic function f. Encryptions S, T of the first set of encryptions E1 and exception encryptions Q, R of the set of exception encryptions E2 may then be calculated in the following way:

$$Q = f(2x \oplus m); R = f(x \oplus m \oplus k); S = f(n \oplus k); \text{ and } T = f(n \oplus y).$$

Correspondence between the first set of encryptions E1 and the set of exception encryptions E2 can then be determined by deciding whether $Q \oplus S = R \oplus T$. Another layer of security may be added, if the operation is preferably not publicly known.

The common secret k which is used in the computations above is known to all edge devices and all setup devices. As the setup devices in particular are often not very well-guarded (a user's mobile phone could function as a setup device), it might be preferable to use separate keys for the setup devices and edge devices, which are, however, still based on the common secret k.

This can, for example, be achieved by determining common secret parts (a, b, c, d), such that $k = a \oplus b$, $k = c \oplus d$, $a \neq c$ and $a \neq d$.

The first and second exception encryptions (Q, R) of the set of exception encryptions E2 and the first and second encryptions (S, T) of the first set of encryptions E1 of are calculated as follows:

$$Q = f(2x \oplus m \oplus a); R = f(x \oplus m \oplus c);$$

$$S = f(n \oplus b); \text{ and } T = f(n \oplus y \oplus d);$$

and wherein the correspondence between the first set of encryptions E1 and the set of exception encryptions E2 is then again determined by deciding whether $Q \oplus S = R \oplus T$.

With respect to the examples described above, f and $\oplus$ can be selected based on a public-key encryption scheme, such as elliptic curve encryption or RSA. Detailed examples are provided below in the detailed description.

The operating mode of the edge device may be a whitelist operating mode or a blacklist operating mode. When the operating mode is a whitelist operating mode, then the exception list is a whitelist, the anonymizable object is anonymized in the selectively modified visual streaming data if the exception information indicates that there is no matching identity in the whitelist. Alternatively, when the operating mode is a blacklist operating mode, then the exception list is a blacklist, the anonymizable object is anonymized in the selectively modified visual streaming data if the exception information indicates that there is a matching identity in the blacklist.

Allowing for different operating modes of the edge device adds to the versatility of the method and respective system. Furthermore, this also adds security, as the central server is, in general, not aware of whether the stored exception list is a whitelist or a blacklist.

There are factors that could make the computational loads very high/not scalable, such as a large white-/blacklist as, for every match request coming from the camera or edge device, the central server should go through the list until there is a match. In case there is no match, the central server would have gone through the whole list before it can answer to the camera on the edge that there is no match found.

Furthermore, a large number of cameras will lead to more matching requests that will be sent to the central server. Also, a large number of appearances might cause a high number of matching requests, thereby also increasing the computational load of the central server.

In order to tackle this problem, it is possible to optionally leave part of the identity vector or quantized identity unencrypted for narrowing the search performed by the central server. The number of components of the identity vector that are not encrypted is a parameter of the system design and provides a trade-off between computational load and security.

Thus, optionally, in addition to sending, by the edge device, the first set of encryptions E1 to the central server, an unencrypted portion of the quantized identity or identity vector may also be sent to the central server by the edge device. In this case, the exception list of the central server furthermore comprises, for each exception set E2, an unencrypted portion of a quantized identity or identity vector corresponding to the exception set E2.

The exception list may then be filtered, i.e. narrowed, based on the received unencrypted portion of the quantized identity or identity vector, thereby generating a filtered exception list, and method step (f2), or method steps (f2-1), (f2-2 and (f2-3), is then performed based on the filtered exception list.

Usually, the identity vector produced by the re-identification algorithm consists of a vector of floating-point numbers. The identifying, i.e. detecting of anonymizable objects in the streaming data, as well as the determining of the identity vector may be implemented by training a neural network, preferably a convolutional neural network. The identity vectors are then quantized so that a vector of integers is obtained. A vector of integers can be encrypted easier with existing encryption mechanisms like ECC and RSA.

Preferably, each component of the vector can be quantized separately. In this case, each component can be encrypted separately. This has two advantages.

The first one is that encrypting each component is more secure. The second more important advantage is that it is more robust against an imperfect re-identification algorithm. For example, re-identification algorithms based on convolutional networks may not be perfect and could calculate an identity vector that is slightly different than the one stored in the exception list. This is problematic because if the error exceeds the quantization border then there might be an erroneous mismatch. However, if quantization and encryption is done per component then a threshold on the number of matching components can be set. For example, the system could be implemented to decide there is a match if 980 of the 1000 components match, allowing for 20 mismatched components, or, in general for 2% mismatched components.

Thus, in the description so far, x and y were the quantized identity vectors. If components of the identity vector are quantized individually, each component would be encrypted individually using the scheme discussed herein both at the camera/edge device and the setup process. The server can then calculate how many components match and depending on the programmed threshold decide if there is a match or not.

The video stream is analyzed frame by frame. In the first step, a detection algorithm detects all anonymizable objects. After this step, we have a set of bounding boxes per frame. In a second step a tracking algorithm pools the detections over several frames in separate appearances for each type. After this step, we typically have a set of image patches per appearance. In a third step, a re-identification algorithm produces an identity vector from all the patches in the appearance.

Besides the method described above, this application also relates to an edge device, setup device and corresponding system. All limitations and explanations which are described with respect to the method may also be applied to the system and vice versa.

An edge device according to the present disclosure comprises the following units:
- at least one capturing unit configured for capturing visual streaming data;
- an identification unit, configured for identifying an anonymizable object in the visual data;
- a quantization unit, configured for calculating a quantized identity y of the identified anonymizable object;
- a private key generating unit, configured for determining an individual private key n for the quantized identity y;
- an encryption generating unit, configured for calculating a first set of encryptions E1 comprising at least two distinct encryptions of the quantized identity, wherein the encryptions of the first set of encryptions E1 are determined based at least on the individual private key n and the quantized identity y;
- an encryption sending unit, configured for sending the first set of encryptions E1 to the central server;
- a receiving unit, configured for receiving from the central server, an exception information wherein the exception information indicates if an exception list of the central server comprises a set of exception encryptions E2 which corresponds to the first set of encryptions E1;
- an anonymization unit, configured for selectively anonymizing the anonymizable object in the streaming visual data depending on the exception information and an operating mode of the edge device, thereby generating selectively modified visual streaming data;
- a stream transmission unit, configured for transmitting the selectively modified visual streaming data to a remote database.

Preferably the central server configured to access an exception list comprising one or more exception sets E2, which is either stored on the central server or in another associated storage. The central server preferably comprises:
- a receiving unit, configured for receiving the first set of encryptions E1 of the quantized identity y sent by the edge device;
- an exception determining unit, configured for determining, whether there is an exception set of encryptions E2 in the exception list comprising at least two distinct exception encryptions such that the first set of encryptions E1 corresponds to the exception set of encryptions E2;
- a sending unit, configured to, if an exception set of encryptions E2 which corresponds to the received first set of encryptions E1 exists in the exception list, send exception information to the edge device indicating that there is a matching identity in the exception list, and otherwise configured to send exception information to the edge device indicating that there is no matching identity information in the exception list.

Optionally, the described system additionally comprises one or more setup devices, which are preferably different than the edge devices, wherein each setup device comprises:
- at least one capturing unit, configured for capturing visual data of an exception object;
- a quantization unit, configured for calculating a quantized identity x of the exception object;
- a private key generating unit, configured for determining an individual private key m for the quantized identity x of the exception object;
- an encryption generating unit configured for calculating the set of exception encryptions E2 comprising at least two distinct exception encryptions of the quantized identity x of the exception object, wherein the exceptions encryptions of the set of exception encryptions are determined based at least on the individual private key m and the quantized identity x;
- a key sending unit, configured for transmitting to the central server, the set of exception encryptions, wherein the central server is configured to add the received set of exception encryptions to the exception list.

A system for selective anonymization according to the present application comprises at least one edge device and a central server as described above.

Optionally, the described system additionally comprises one or more setup devices as described above, wherein the setup devices are preferably different than the edge devices. Instead of using a single central server, also a network of two or more central servers may be used. Also, the associated storage of the central server may be an internal storage of the central server, or it may be an external and/or distributed storage.

This application also relates to a computer program product comprising instructions which, when the program is executed by a computer system, cause the computer system to carry out the steps of the method described above. The computer system on which the instructions are executed might, e.g. comprise one or more edge devices, a central server and, optionally, one or more setup devices as described above.

Examples of the present disclosure will now be specified with respect to the drawings.

Below specific examples regarding the implementation of a system for selective anonymization and the respective method are provided. Also, the main components of such a system for selective anonymization, namely edge devices, central servers and setup devices are also discussed, both individually and in the context of the system.

Figure 1:
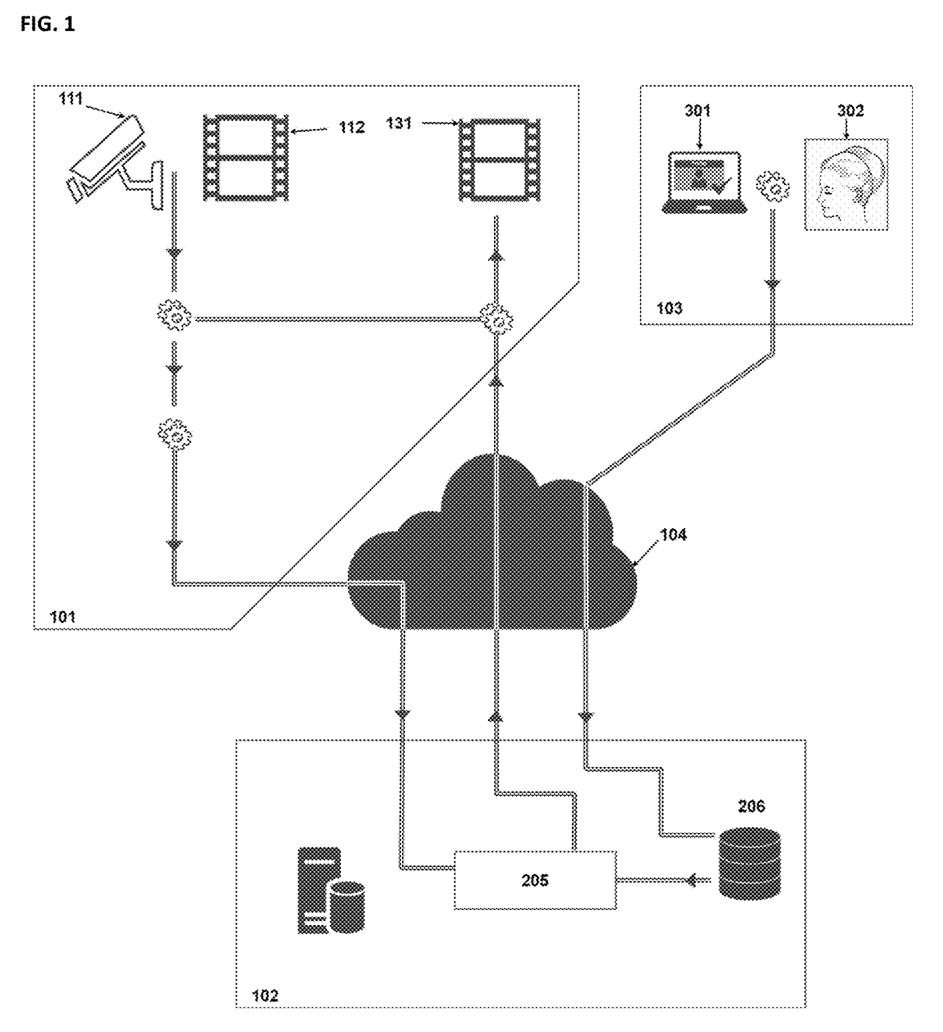
FIG. 1 shows a schematic overview of a system according to the present disclosure.

FIG. 1 shows a schematic overview of a system 100 for selective anonymization comprising, as components, an edge device 101, a central server 102 and a setup device 103. It is also possible for the system to comprise one or more of each of these devices, in particular in case of the edge device 101 and the setup device 103, the system usually comprises multiple of these devices. Multiple, distributed, central servers are also possible.

Figure 5A:
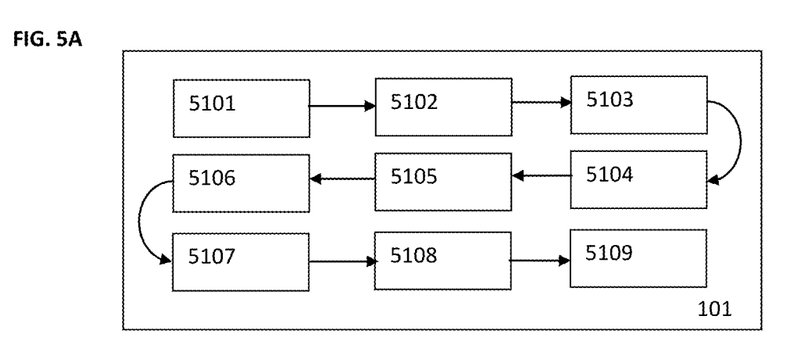
FIG. 5A schematically shows the components of the edge device.
Figure 5B:
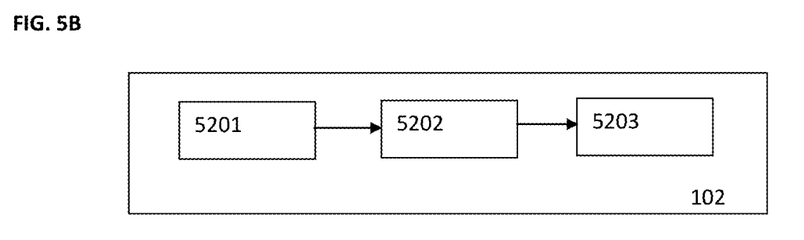
FIG. 5B schematically shows the components of the central server.
Figure 5C:
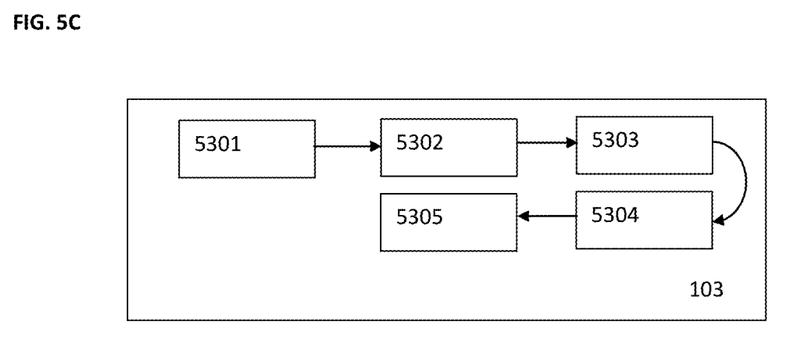
FIG. 5C schematically shows the components of the setup device.

FIGS. 5A to 5C show the units used within the components or devices of the described system schematically, as well as the usual control flow within each component.

FIG. 5A shows the components of the edge device 101, which comprises at least one capturing unit 5101, an identification unit 5102, a quantization unit 5103, a private key generating unit 5104, an encryption generating unit 5105, an encryption sending unit 5106, a receiving unit 5107, an anonymization unit 5108, and a stream transmission unit (5109).

FIG. 5B shows the components of the central server 101, which comprises a receiving unit 5201, an exception determining unit 5202, and a sending unit 5203.

FIG. 5C shows the components of the optional setup device, which comprises at least one capturing unit 530, a quantization unit 5302, a private key generating unit 5303, an encryption generating unit 5304, and a key sending unit 5305.

The functionality associated with each unit of the edge device 101, the central server 102 and the optional setup device 103 is further explained in the following.

The edge device 101 comprises or is associated with a camera 111 which captures a video sequence 112, also referred to as visual streaming data. The edge device then calculates encryptions (as further described below) based on anonymizable objects, such as faces, people, number plates, etc. identified in said video sequence 112 and sends the calculated encryption to the central server 102. The edge device 101 furthermore receives a response from the central server which indicates if a matching exception was found in the database 206 associated with the central server 102. Based on the received response and the operating mode of the edge device, a modified video sequence 131 is generated, wherein the privacy infringing visual data is selectively anonymized. The operating mode of the edge device 101 might be a whitelist mode, where anonymization is the default, or a blacklist mode, where transmission without anonymization is the default.

The central server 102 comprises or is associated with a database 206 in which a list of exception encryptions is stored based on which it is determined if an anonymization exception exists for an anonymizable object which was detected by the edge device. The central server receives encryptions from the edge device and compares the received encryptions with the exception encryptions stored in the associated database 206.

The setup device 103 is used for adding exceptions to the database 206 associated with the central server 102. In particular, the setup device provides an infrastructure through which, for example, a person can be added to the exception list. This can be achieved by capturing one or more images 302 of the respective person in combination with said person (digitally) signing a respective agreement or contract, for example, using a computer 301 and a respective user profile, to have their identity added to the exception list stored in the database 206.

The edge device 101, central server 102 and setup device 103 communicate using a wired and/or wireless communication infrastructure, such as an online cloud service that may be supplied by a third party. As the security of the communication infrastructure cannot always be guaranteed, it is especially important that all communication of sensitive data is encrypted and illegible for anyone who might intercept the communication.

Figure 2:
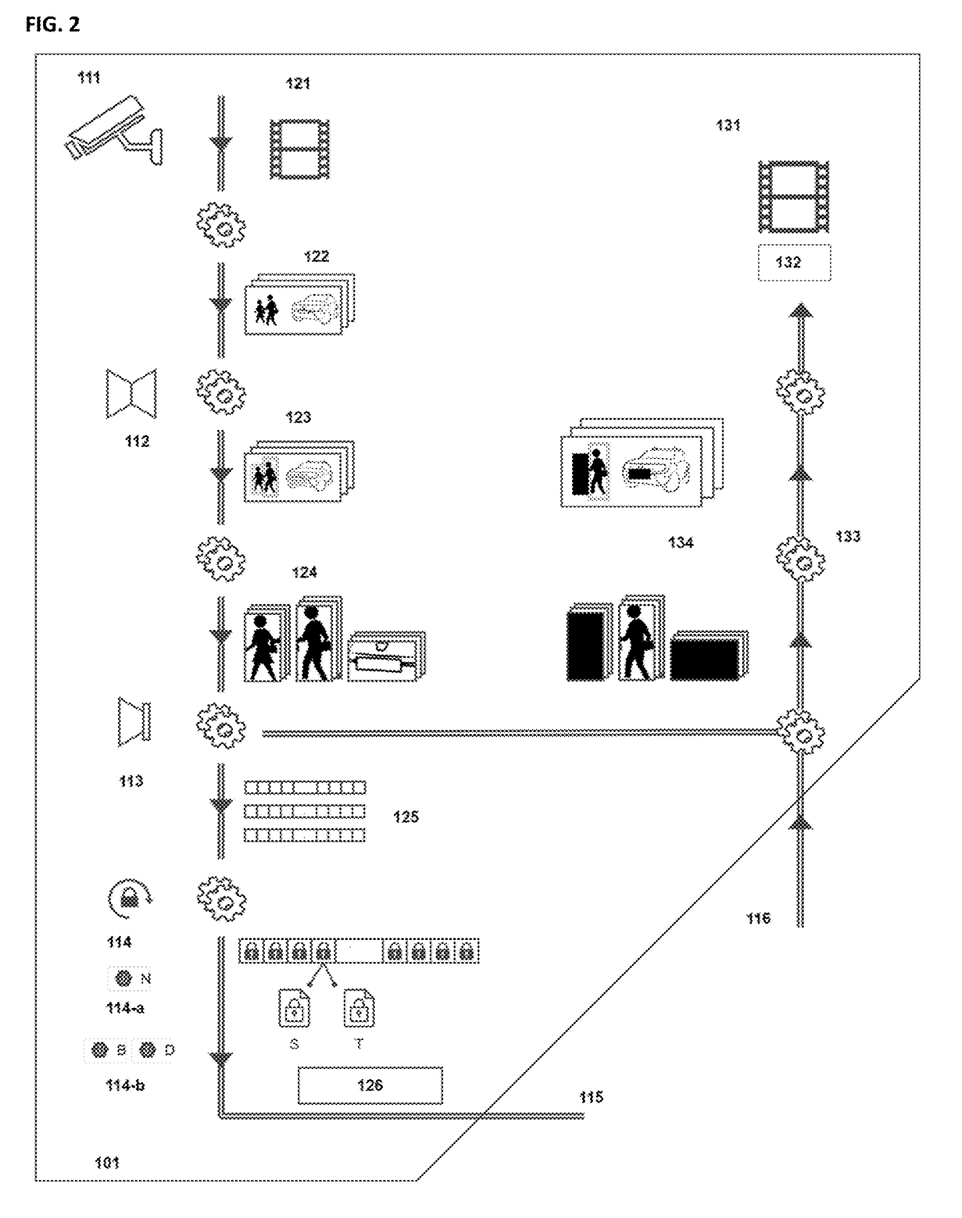
FIG. 2 shows a schematic view of an edge device.

FIG. 2 shows a more detailed view of the edge device 101 and the associated control flow. As discussed above, the edge device is associated with a camera 111 which captures a video sequence 121. The capturing visual streaming data 121 is for example performed by the capturing unit 5101 of FIG. 5A. Said video sequence 121 is then first divided into frames or individual pictures 122 based on which an object detection algorithm 112, for example, based on a convolutional neural network, is used in order to detect the anonymizable objects 123 in the video sequence. For each detected object 124, for example, a person, an appearance is defined which includes all consecutive frames in which the respective person is visible.

For each person, the re-identification network 113 is then used in order to determine a unique identity vector 125 for the respective person. Said re-identification network 113 generates the identity vector based on, for example, facial characteristics in such a manner that separate appearances of the same person will, with a high likelihood, result in the same or very similar identity vector. Based on the identity vector, a quantized, i.e. numeric, identity y for the person is determined using a predefined quantization method. Said identifying of the anonymizable object in the visual streaming data is, for example, performed by the identification unit 5102 of FIG. 5A, while said calculation of the quantized identity is, for example, performed by the quantization unit 5103 of FIG. 5A.

Based on the quantized identity y, the encryption process 114 of the edge device 101 is then used to generate at least two encryptions for the quantized identity y.

In order to generate at least two encryptions S and T of the quantized identity y, an individual private key n is generated which serves as an offset and to further safeguard the encryptions. The generation of the private key is, for example, performed by the private key generating unit 5104 of FIG. 5A.

The encryptions S and T are then generated based, at least in part, on the quantized identity y, the private key n and, preferably, a cryptographic function f as well as a common secret k or common secret parts b and d. The generation of the encryptions S and T is, for example, performed by the public key generating unit 5105 of FIG. 5A.

Details regarding exemplary implementations of the encryption algorithm 114 are discussed below for the edge device and setup device together.

After the encryptions have been calculated, a match identity request 126 is sent to the central server 102, thereby prompting the central server to check for matching exception encryptions in the database 206, using communication link 115, which might be a wired or wireless connection. The match request comprises sending the encryptions S and T, which may also be referred to as the first public key S and the second public key T to the central server, which may be performed by the key sending unit 5106 of FIG. 5A.

The edge device 101 then receives, for example using the receiving unit 5107 of FIG. 5A, an anonymization information 133 through a communication link 116, wherein said anonymization information, which might also be referred to as an exception information, is used by the edge device in combination with an operation mode to determine, which quantized identities need to be anonymized. Depending on the received anonymization information, the edge device then modifies the original video sequence 121 by selectively anonymizing, for example using the anonymization unit 5108 of FIG. 5A, objects 134, and for generating a selectively modified video sequence 131, which may then be transmitted, by using the stream transmission unit 5109 of FIG. 5A, to other, remote, devices without infringing on the personal data of any of the captured people or objects.

The process on the camera waits for the answer from the central server before it either anonymizes the appearances or keeps the original appearance intact. In order to achieve this, it needs to keep information of the location and duration of the appearances inside the video(stream)/image. The vertical control flow between the outgoing and incoming data within the edge device 101 in FIGS. 1 and 2 represents this flow of information.

In this way, the identity of the appearance that was calculated by the re-identification network is implicitly kept until an answer comes back from the server. In some cases, the edge device may furthermore retain the information regarding the anonymization of a quantized identity at least temporarily in order to simplify the process when the same object/person is captured multiple times by the same camera. For example, if a retail store wants to track how customers move in their store, customers may appear several times in front of the same camera. This could also be extended to multiple cameras within the same location.

Figure 3:
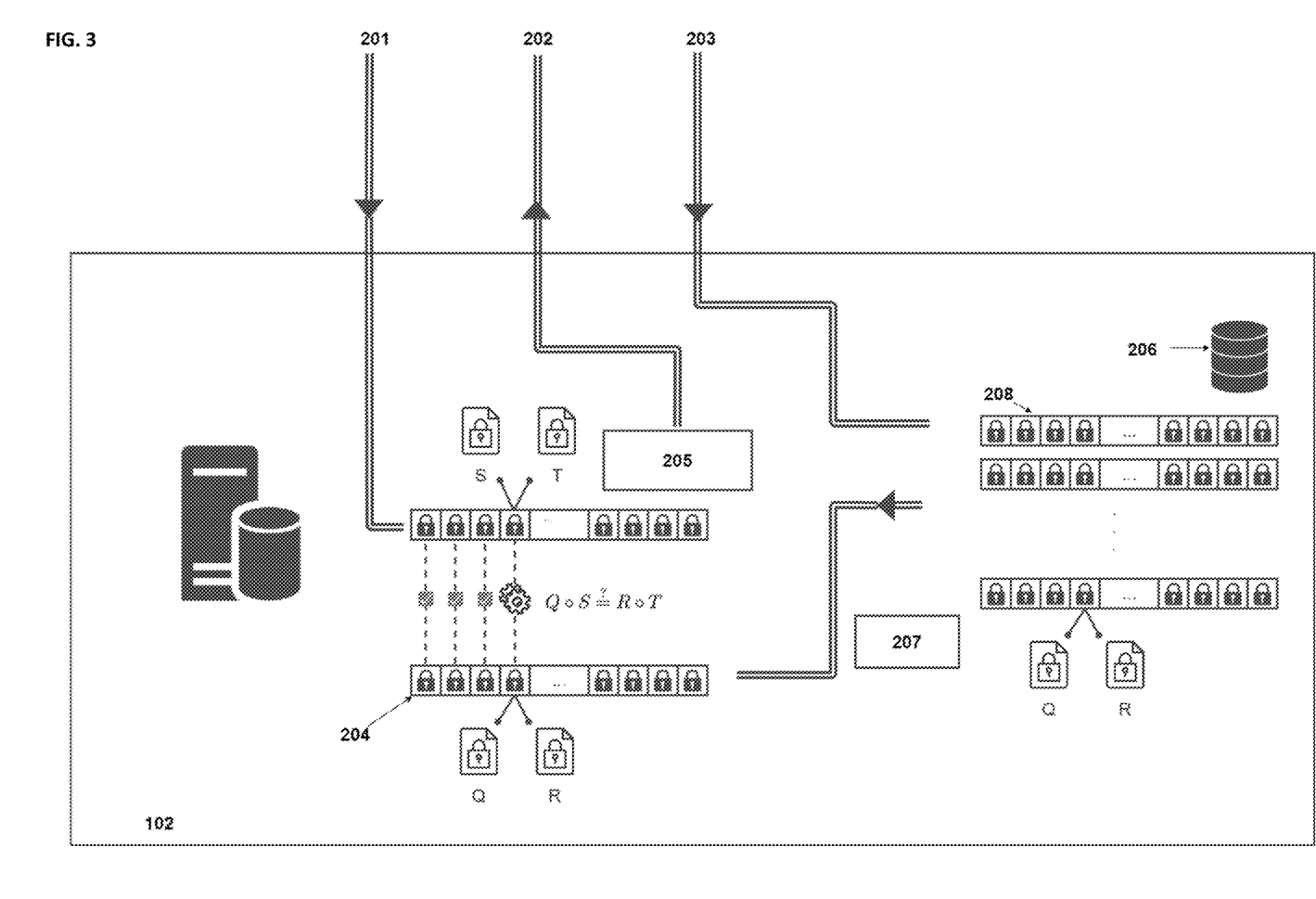
FIG. 3 shows a schematic view of a central server.

FIG. 3 shows a more detailed view of the central server 102 including the communication channels 201, 202, 203 for interacting with the edge device and setup device.

The central server receives, as input, requests for matching an identity through communication link 201, which is connected communicatively to communication link 115 in FIG. 2. The receiving may be performed by the receiving unit 5201 of the central server 102, as shown in FIG. 5B. Said requests to match an identity comprise a set of encryptions comprising at least two encryptions S and T. The central server then compares said set of encryptions with sets of exception encryptions stored in the associated database 206, which are fetched 207 from the database 206. The exception encryption sets are organized in an exception list 208, and each of exception encryption sets also comprises at least two exception encryptions, for example the encryption Q and R shown in FIG. 2, are then matched with the received set of encryptions of the edge device, including encryptions S and T using an identity matching process 204. The determination of whether there exists a matching exception set in the exception list 208 of the central server may be performed by the exception determining unit 5202, as shown in FIG. 5B.

Once either a match was found or the exception list 208 was searched entirely and no match was found, the resulting identity match response 205 is then communicated back to the edge device 101 using communication link 202, which is communicatively linked to the communication link 116 of FIG. 1. Said communicating of the matching result may be implemented by the sending unit 5203 as shown in FIG. 5B.

The central server 102, furthermore receives list addition requests from the setup device 103 via the communication link 203, which corresponds to the communication link 307 of the setup device. A list addition request generally comprises a set of exception encryptions E2 which should be added to the exception list 208 comprised by the database 206, wherein the set of exception encryptions E2 comprises at least two distinct exception encryptions Q and R. Before a set of exception encryptions is added to the exception list 208, it can optionally be checked if the same exception is already contained in the list. In order to do this, a matching request is generated in the same manner as described above with respect to the edge device. If no match is found, then the exception encryptions are added to the list.

Additionally, it is also possible to store an unencrypted part of the quantized identity in the database 206 for each exception set, which can be used, in combination with a correspondingly unencrypted part of a quantized identity transmitted by the edge device for filtering the exception list 208, thereby decreasing the number of comparisons which are necessary to determine if a match has been found.

Figure 4:
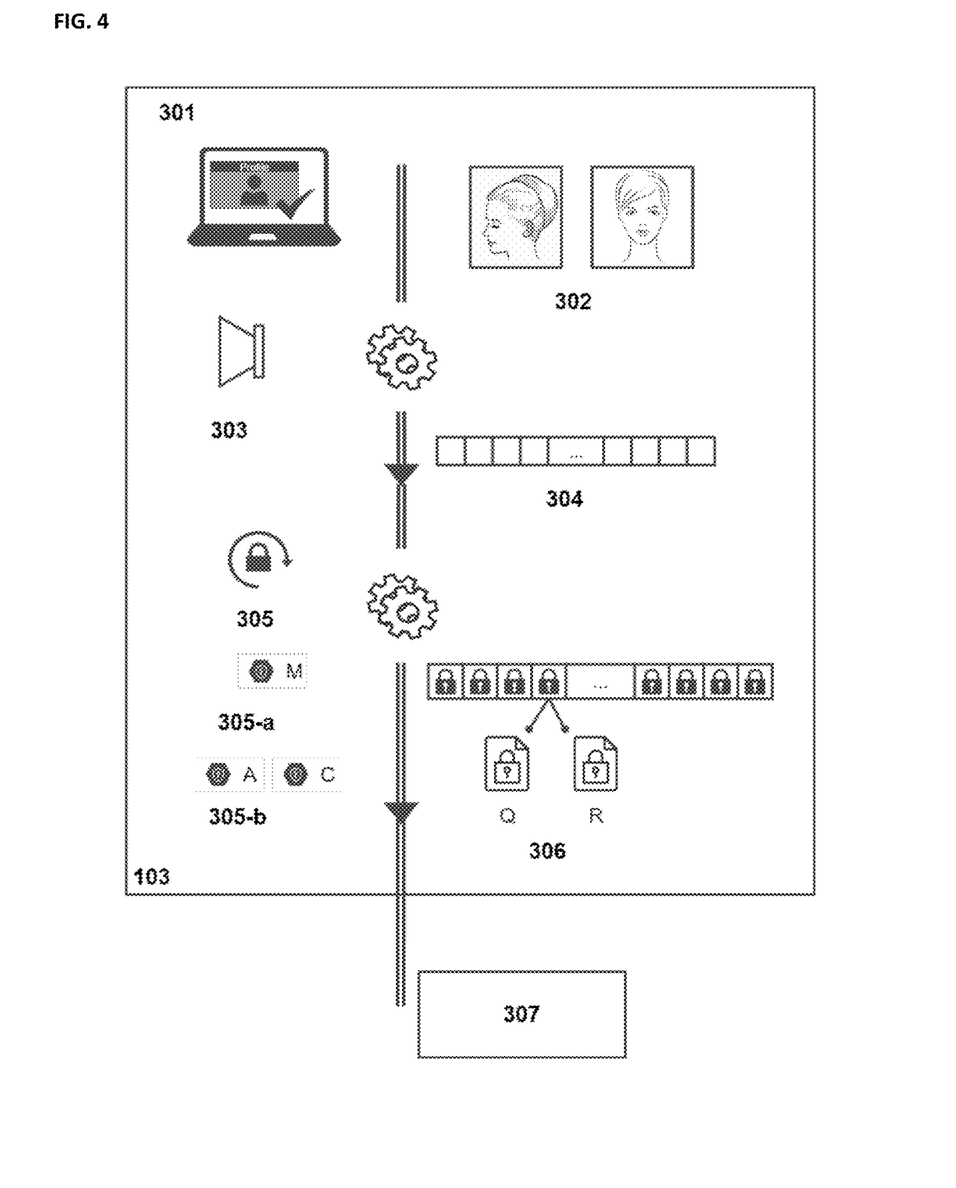
FIG. 4 shows a schematic view of a setup device.

FIG. 4 shows a more detailed view of the setup device 103 and associated control flow. As discussed above, the setup device processes list addition requests and determines the respective encryptions to be added to the exception list 208 of the central server 102.

When an exception (which can be an opt-in or opt-out request, depending on the default mode of the edge device 101) for a person is to be added to the exception list 208, this usually involves pictures of the respective person 302 and an agreement to be added to the exception list 208, which can, for example, be provided via an online profile or other forms of secure identification. The capturing or receiving of said pictures can be performed by the capturing unit 5301 of the setup device 103, as shown in FIG. 5C.

Based on the provided pictures 302, the setup device uses a re-identification network 303, which is implemented correspondingly to the re-identification network 113 of the edge device 101, to determine an identity vector 304 for the person, based on which a quantized identity x is then calculated using, for example the quantization unit 5302 of FIG. 5C.

Similarly, to the encryption process 114 implemented by the edge device 101, the encryption process 305 of the setup device calculates an individual private key m, using for example the private key generating unit 5303 of FIG. 5C, for the quantized identity x, which functions as an offset to prevent the comparison of the calculated encryption by simple means.

Based on the quantized identity x and the private key m, the setup device then calculates at least two exception encryptions Q and R, preferably using a cryptographic function f and a common secret k, which are also used by the encryption process of the edge device 101. Instead of a common secret k, also common secret parts a and c may be used as further explained below. The two exception encryptions Q and R can, for example, be generated using the public key generating unit 5304 as shown in FIG. 5C.

The exception encryptions set E2 306, which comprises the exception encryptions Q and R is then transmitted to the central server 102 with a list addition request 307 via the depicted communication link, using the key sending unit 5303 of the setup device 103 as shown in FIG. 5C.

Below the used encryption scheme is first described at a higher level but, for exemplary reasons, only using two encryptions in each set. It is, however, easily possible to generalize the proposed scheme to any number of encryptions in both the set calculated and transmitted by the edge device as well as the exception set stored in the database 206.

The used encryption and comparison scheme is based on comparing two separately captured objects by way of a central server in such a manner, that the central server does not obtain any information regarding the actual quantized identities, i.e. identifiers of the respective objects, nor regarding the keys used for encrypting said quantized identities.

In this way, the quantized identities are not shared, but a comparison of said quantized identities is still possible by way of the calculated encryptions. The encryptions S and T which are generated by the edge device are thereby compared with the exception encryptions Q and R stored on the central server, wherein the comparison is performed with respect to a predefined operation.

The predefined comparison operation is based on performing two separate arithmetic operations, each of which is performed by taking arguments from both the encryptions provided by the edge device and the exception encryptions stored on the central server. Thus, a cross-check is implemented, which is designed to cancel out the respective offsets when comparing the results of the two separately performed arithmetic operations, so that a comparison of the results of the two arithmetic operations amounts to a comparison of the two quantized identities based on which, on the one hand, the encryptions of the edge device, and, on the other hand, the exception encryptions stored on the central server, and originally determined by the setup device, were determined. As the encryption is implemented using a cryptographic function, together with a compatible binary operation, the encryptions are computationally very expensive to reverse, but the comparison is still easily computable.

Thus, it becomes possible to indirectly compare the quantized identities without needing to transmit any of the quantized identities, the used encryption scheme, the generators or common keys used in the encryption scheme, the "raw" encrypted quantized identities (based on which a simple comparison would be possible for an intruder). Thus, in order to compromise the anonymization scheme, it is not sufficient to break into the central server.

Thus, S,T, Q and R are calculated based on the respective quantized identities x and y and the respective private keys n and m, using a common key k and a cryptographic function f with a matching binary operation $\oplus$, i.e. $f(v \oplus w) = f(v) \oplus f(w)$ for all v,w in the domain of the cryptographic function f in the following manner, $$Q = f(2x \oplus m); R = f(x \oplus m \oplus k);$$

$$S = f(n \oplus k); \text{ and } T = f(n \oplus y).$$

Then, it is possible to decide if x=y by deciding if $Q \oplus S = R \oplus T$.

In order to further increase the security, in case either one of the edge device or the setup device is compromised, e.g. broken into by an attacker, it is additionally possible to prevent the attacker from spoofing the system by using common secret parts of k instead of one common secret k known to both the edge device and the setup device. This is achieved by generating two random splits of k, i.e. numbers a, b, c and d, wherein $k = a \oplus b$, $k = c \oplus d$, $a \neq c$ and $a \neq d$.

The central server 102 does not have access to any one of the numbers a, b, c and d, nor to their encrypted counterparts f(a), f(b), f(c) and f(d). The setup device only has access to a and c, or preferably f(a) and f(c), while the edge device only has access to b and d, or preferably f(b) and f(d). The values for the encryptions S, T, Q and R can now be calculated as follows $$Q = f(2x \oplus m \oplus a); R = f(x \oplus m \oplus c);$$

$$S = f(n \oplus b); \text{ and } T = f(n \oplus y \oplus d).$$

Then, it is again possible to decide if x=y by deciding if $Q \oplus S = R \oplus T$.

Detailed examples regarding some encryption and comparison schemes which can be used by the edge device 101, central server 102 and setup device 103 in order to achieve the object of this disclosure, i.e. to provide a secure method for selective anonymization, are provided below. Detailed examples are provided for cryptographic functions based on elliptic curve cryptography and RSA using two distinct encryptions for each of the encryption sets. It is, however, easily possible to modify the schemes for other cryptographic functions and encryption sets comprising more than two components.

Encryption Based on Elliptic Curves:

The encryption scheme discussed above can be implemented using elliptic curves in the following manner:

$$f(x) = l \cdot x \bmod P,$$

where l and P are predefined numbers. Thus, f is the point multiplication of elliptic curves with a modulo. Calculating the point multiplication scales logarithmic with l, the reverse operation scales linearly with l. So, for very large l, this is a one-way function computationally.

Furthermore, for elliptic curves, the binary operator $\oplus$, which is preserved by f is defined as $u \oplus v = (u+v) \bmod P$, which is the elliptic curve point addition with a modulo.

In case two encryptions S and T are calculated by the edge device and two encryptions Q and R are calculated by the setup device, and a common secret k is used for both the edge and the setup device, then, for example, $$Q = (l \cdot (2x+m)) \bmod P; R = (l \cdot (x+m+k)) \bmod P;$$

$$S = (l \cdot (n+k)) \bmod P; \text{ and } T = (l \cdot (n+y)) \bmod P.$$

If the common secret k is to be split into common secret parts a, b, c and d, this can be achieved in the case of elliptic curves by selecting a, b, c and d such that $k = (a+b) \bmod P$; and $k = (c+d) \bmod P$.

$$Q = (l \cdot (2x+m+a)) \bmod P; R = (l \cdot (x+m+c)) \bmod P;$$

$$S = (l \cdot (n+b)) \bmod P; \text{ and } T = (l \cdot (n+y+d)) \bmod P.$$

Encryption Based on the RSA Algorithm:

The encryption scheme discussed above can be implemented using an RSA-scheme in the following manner:

$$f(x) = x^l \bmod P,$$

where l and P are predefined numbers. Thus, f is the exponentiation with a modulo. As known in the context of RSA, this operation is a one-way function for sufficiently large l. Furthermore, for RSA, the binary operator $\oplus$, which is preserved by f is defined as $u \oplus v = (u \cdot v) \bmod P$, which is multiplication with a modulo.

$$Q = (2x \cdot m)^l \bmod P; R = (x \cdot m \cdot k)^l \bmod P;$$

$$S = (n \cdot k)^l \bmod P; \text{ and } T = (n \cdot y)^l \bmod P.$$

If the common secret k is to be split into common secret parts a, b, c and d, this can be achieved in the case of RSA by selecting a, b, c and d such that $k = (a \cdot b) \bmod P$; and $k = (c \cdot d) \bmod P$.

$Q=(2x \cdot m \cdot a)^l \mod P$; $R=(x \cdot m \cdot c)^l \mod P$;

$S=(n \cdot b)^l \mod P$; and $T=(n \cdot y \cdot d)^l \mod P$.

Thus, for both examples provided above, none of the quantized identities x and y or any of the used keys, functions or secrets f, k, n, m, a, b, c, d, l or P are ever transmitted to the central server. The central server only needs to be aware of ⊕ in order to perform the comparison of the two sets of encrypted identities, thereby solving the posed objective of providing a secure mechanism for determining whether private data needs to be anonymized without actually ever transmitting any privacy infringing data.

Other public key encryption schemes could also be used based on the one-way function implemented within said other public key encryption schemes.

The invention claimed is:

1. A method for selective anonymization, the method comprising steps:
   capturing, by an edge device of one or more edge devices, visual streaming data;
   identifying, by the edge device, an anonymizable object in the visual streaming data;
   determining, by the edge device, a quantized identity of the identified anonymizable object;
   generating, by the edge device, an individual private key for the quantized identity;
   determining, by the edge device, a first set of encryptions comprising at least two distinct encryptions of the quantized identity, wherein the encryptions of the first set of encryptions are determined based at least on the individual private key and the quantized identity;
   sending, by the edge device, the first set of encryptions of the quantized identity to a central server;
   receiving, by the edge device from the central server, an exception information, wherein the exception information indicates whether an exception list of the central server comprises a set of exception encryptions which corresponds to the first set of encryptions;
   selectively anonymizing, by the edge device, the anonymizable object in the visual streaming data depending on the exception information and an operating mode of the edge device, thereby generating selectively modified visual streaming data; and
   transmitting, by the edge device, the selectively modified visual streaming data to a remote database.

2. The method of claim 1, further comprising:
   receiving, by the central server, the first set of encryptions of the quantized identity sent by the edge device;
   determining, by the central server, whether there is an exception set in the exception list comprising at least two distinct exception encryptions such that the first set of encryptions corresponds to the exception set of encryptions; and
   in response to determining there is the exception set of encryptions which corresponds to the received first set of encryptions in the exception list, sending, by the central server to the edge device, exception information indicating that there is a matching identity in the exception list, otherwise, sending, by the central server to the edge device, exception information indicating that there is no matching identity information in the exception list.

3. The method of claim 2, wherein correspondence of the first set of encryptions and the set of exception encryptions is determined by:
   determining a first result of a first operation which takes as input at least a first encryption of the first set of encryptions and a first exception encryption of the set of exception encryptions;
   determining a second result of a second operation which takes as input at least a second encryption of the first set of encryptions and a second exception encryption of the set of exception encryptions; and
   determining that the first set of encryptions corresponds to the set of exception encryptions when the first result equals the second result, wherein the first encryption, the second encryption, the first exception encryption and the second exception encryption are mutually distinct.

4. The method of claim 3, wherein the set of exception encryptions is added to the exception list of the central server before the method steps of claim 1, and wherein the method further comprises:
   capturing, by a setup device, visual data of an exception object;
   determining, by the setup device, a respective quantized identity of the exception object;
   determining, by the setup device, an individual private key for the respective quantized identity of the exception object;
   determining, by the edge device, the set of exception encryptions comprising at least two distinct exception encryptions of the respective quantized identity of the exception object, wherein the exception encryptions of the set of exception encryptions are determined based at least on the individual private key and the respective quantized identity; and
   transmitting, by the setup device to the central server, the set of exception encryptions, wherein the central server adds the received set of exception encryptions to the exception list.

5. The method of claim 3, wherein the encryptions of the first set of encryptions and the exception encryptions of the set of exception encryptions are further determined based on a cryptographic function (f) and a common secret (k), wherein the cryptographic function is a one-way encryption function.

6. The method of claim 5, wherein the first exception encryption (Q) and the second exception encryption (R) and the first and second encryptions (S,T) are determined according to $Q=f(2x \oplus m)$, $R=f(x \oplus m \oplus k)$, $S=f(n \oplus k)$, and $T=f(n \oplus y)$, for a binary operation ⊕, and wherein the correspondence between the first set of encryptions and the set of exception encryptions is determined by deciding whether $Q \oplus S = R \oplus T$, wherein the binary operation ⊕ is a commutative operation, which is preserved by the cryptographic function (f), wherein x corresponds to a respective quantized identity of an exception object, wherein m corresponds to an individual private key for the respective quantized identity of the exception object, wherein y corresponds to the quantized identity of the identified anonymizable object, and wherein n corresponds to an individual private key for the quantized identity of the identified anonymizable object.

7. The method of claim 6, further comprising:
   determining one or more common secret parts a, b, c, or d, wherein $k=a \oplus b$, $k=c \oplus d$, wherein $a \neq c$ and $a \neq d$, wherein the first and second exception encryptions (Q, R) and the first and second encryptions (S,T) are determined according to $Q=f(2x \oplus m \oplus a)$; $R=f(x \oplus m \oplus c)$; $S=f(n \oplus b)$; and $T=f(n \oplus y \oplus d)$, and wherein the correspondence between the first set of encryptions and the set of exception encryptions is determined by deciding whether Q⊕S=R⊕T, wherein a and c correspond to common secret parts of a setup device, and wherein b and d correspond to common secret parts of the edge device.

8. The method of claim 6, wherein ⊕ is preserved by the cryptographic function such that f(v⊕w)=f(v)⊕f(w) for all v, w in the domain of the cryptographic function.

9. The method of claim 2, further comprising:
sending, by the edge device, an unencrypted portion of the quantized identity to the central server, wherein the exception list of the central server furthermore comprises, for each exception set, a respective unencrypted portion of a respective quantized identity corresponding to the exception set;
receiving the unencrypted portion of the respective quantized identity at the central server; and
filtering, by the central server, the exception list based on the received unencrypted portion of the quantized identity, thereby generating a filtered exception list.

10. The method of claim 1, wherein the operating mode of the edge device is a whitelist operating mode or a blacklist operating mode, wherein, when the operating mode is the whitelist operating mode, the exception list is a whitelist, and the anonymizable object is anonymized in the selectively modified visual streaming data when the exception information indicates that there is no matching identity in the whitelist, and wherein when the operating mode is the blacklist operating mode, then the exception list is a blacklist, and the anonymizable object is anonymized in the selectively modified visual streaming data when the exception information indicates that there is a matching identity in the blacklist.

11. The method of claim 1, wherein the identifying of the anonymizable object in the visual streaming data comprises detection of anonymizable objects and determining one or more identity vectors for the detected anonymizable objects, and wherein the detection of the anonymizable objects and the determining of the one or more identity vectors is implemented by training a neural network.

12. The method of claim 11, wherein the quantized identity of the anonymizable object is determined by quantizing two or more components of the identity vector separately using a quantization method.

13. The method of claim 12, wherein the quantization method is a uniform quantization method.

14. The method of claim 12, wherein the quantization method is a non-uniform quantization method.

15. A system for selective anonymization, the system comprising:
a central server; and
an edge device, the edge device comprising:
at least one capturing member configured to capture visual streaming data;
an identification member configured to identify an anonymizable object in the visual streaming data;
a quantization member configured to determine a quantized identity of the identified anonymizable object;
a private key generating member, configured to generate an individual private key for the quantized identity;
an encryption generating member configured to generate for calculating a first set of encryptions comprising at least two distinct encryptions of the quantized identity, wherein the encryptions of the first set of encryptions are determined based at least in part on the individual private key and the quantized identity;
an encryption transmission member, configured to transmit the first set of encryptions to the central server;
a receiving member, configured to receive from the central server, an exception information wherein the exception information indicates whether an exception list of the central server comprises a set of exception encryptions which corresponds to the first set of encryptions;
an anonymization member, configured to selectively anonymize the anonymizable object in the streaming visual data based on the exception information and an operating mode of the edge device to generate selectively modified visual streaming data; and
a stream transmission member, configured to transmit the selectively modified visual streaming data to a remote database.

16. The system of claim 15, wherein the central server is configured to access the exception list comprising one or more exception sets, and wherein the central server comprises:
a receiving member configured to receive the first set of encryptions of the quantized identity sent by the edge device;
an exception determining member configured for determining whether there is an exception set in the exception list comprising at least two distinct exception encryptions such that the first set of encryptions corresponds to the exception set of encryptions; and
a transmission member configured to:
when an exception set of encryptions which corresponds to the received first set of encryptions exists in the exception list, send exception information to the edge device indicating that there is a matching identity in the exception list; and
otherwise send exception information to the edge device indicating that there is no matching identity information in the exception list.

17. The system of claim 15, wherein the system additionally comprises a setup device, the setup device comprising:
at least one capturing member, configured to capture visual data of an exception object;
a second quantization member configured to determine a quantized identity of the exception object;
a private key generating unit, configured for determining an individual private key for the quantized identity of the exception object;
a second encryption generating member configured to determine the set of exception encryptions comprising at least two distinct exception encryptions of the quantized identity of the exception object, wherein the exceptions encryptions of the set of exception encryptions are determined based at least on the individual private key and the quantized identity; and
a key transmission member configured to transmit to the central server, the set of exception encryptions, wherein the central server is configured to add the received set of exception encryptions to the exception list.

18. A non-transitory computer-readable medium with instructions stored thereon, which, when executed by a processor of a computing device, cause the processor to:
capture visual streaming data;
identify an anonymizable object in the visual streaming data;
determine a quantized identity of the anonymizable object;

generate an individual private key for the quantized identity;
generate an encryption set comprising at least two distinct encryptions of the quantized identity;
transmit the encryption set to a central server;
receive, from the central server, an exception information, wherein the exception information indicates whether an exception list of the central server comprises an exception encryption set that corresponds to the encryption set;
selectively anonymize the anonymizable object in the streaming visual data based on at least one of the exception information or an operating mode of the computing device;
generate selectively modified visual streaming data; and
transmit the selectively modified visual streaming data to a remote database.

19. The non-transitory computer-readable medium of claim 18, wherein one or more encryptions of the encryption set are determined based at least in part on at least one of the individual private key or the quantized identity.

20. The non-transitory computer-readable medium of claim 18, wherein the computing device is an edge computing device communicatively coupled to the central server.

* * * * *